US010427795B2

(12) United States Patent
Telgkamp et al.

(10) Patent No.: US 10,427,795 B2
(45) Date of Patent: Oct. 1, 2019

(54) VARYING A CROSS SECTION OF A RAM AIR PASSAGE

(71) Applicant: AIRBUS OPERATIONS GMBH, Hamburg (DE)

(72) Inventors: Jens Telgkamp, Hamburg (DE); Dirk Elbracht, Hamburg (DE); Wolfgang Eilken, Hamburg (DE); Bruno Stefes, Hamburg (DE); Christian Bartels, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 282 days.

(21) Appl. No.: 14/674,320

(22) Filed: Mar. 31, 2015

(65) Prior Publication Data

US 2015/0284099 A1    Oct. 8, 2015

(30) Foreign Application Priority Data

Apr. 3, 2014  (EP) .................................... 14163363

(51) Int. Cl.
| | | |
|---|---|---|
| *B64D 13/00* | (2006.01) | |
| *B64D 13/06* | (2006.01) | |
| *B64D 33/08* | (2006.01) | |

(52) U.S. Cl.
CPC ............ *B64D 13/06* (2013.01); *B64D 13/00* (2013.01); *B64D 33/08* (2013.01); *B64D 2013/0618* (2013.01); *B64D 2241/00* (2013.01)

(58) Field of Classification Search
CPC ........ B64D 13/06; B64D 13/00; B64D 33/08; B64D 2013/0618; B64D 2241/00
USPC ......................................................... 454/76
See application file for complete search history.

(56) References Cited

U.S. PATENT DOCUMENTS

| | | | |
|---|---|---|---|
| 3,443,598 A | | 5/1969 | Pierce |
| 4,509,786 A | * | 4/1985 | Gregg .................. B62D 35/001 292/263 |
| 5,026,243 A | * | 6/1991 | Dell ....................... B65G 69/30 14/71.1 |
| 5,033,693 A | | 7/1991 | Livingston et al. |

(Continued)

FOREIGN PATENT DOCUMENTS

| | | |
|---|---|---|
| EP | 0 358 347 A2 | 3/1990 |
| WO | WO 2006/067296 A1 | 6/2006 |
| WO | WO 2007/051137 | 5/2007 |

OTHER PUBLICATIONS

European Search Report for Application No. 14 16 3363 dated Sep. 11, 2014.

(Continued)

*Primary Examiner* — Helena Kosanovic
(74) *Attorney, Agent, or Firm* — Jenkins, Wilson, Taylor & Hunt, P.A.

(57) ABSTRACT

Inter alia, an apparatus including a ramp, the ramp configured to enable variation of a cross section of a ram air passage of the apparatus. The ramp includes a first rigid member, a second rigid member and a flexible member coupled to the first rigid member and the second rigid member. The ramp is movably mounted at two ends. Moreover, a method of varying the cross section of the ram air passage of such an apparatus by moving the ramp of the apparatus is disclosed. Further, an arrangement including such an apparatus and a ram air channel communicating with the ram air passage is disclosed.

10 Claims, 2 Drawing Sheets

(56) References Cited

U.S. PATENT DOCUMENTS

| | | | |
|---|---|---|---|
| 6,089,505 A | 7/2000 | Gruensfelder et al. | |
| 6,098,925 A * | 8/2000 | Burdsall, II | B64D 1/06 244/118.1 |
| 2009/0253361 A1 | 10/2009 | Porte et al. | |

OTHER PUBLICATIONS

European Office Action for European Application No. 14163363.6 dated Dec. 6, 2017.

* cited by examiner

VARYING A CROSS SECTION OF A RAM AIR PASSAGE

CROSS-REFERENCE TO RELATED APPLICATION

This application claims priority to EP 14 163 363.6 filed Apr. 3, 2014, the entire disclosure of which is incorporated by reference herein.

TECHNICAL FIELD

The disclosure herein relates to an apparatus comprising a ramp, the ramp being configured to enable variation of a cross section of a ram air passage of the apparatus. The disclosure herein further relates to a method comprising varying a cross section of a ram air passage of such an apparatus by moving the ramp of the apparatus.

BACKGROUND

Ram air channels are used in vehicles, e.g. aircrafts, for the supply of different systems with ambient air. To name but one example, a ram air channel may be used for supplying an aircraft air-conditioning system with ambient air. In this case, the ambient air may for instance serve for cooling hot bleed air that is used for the pressurization of the aircraft cabin.

Generally, air demand is likely to vary during operation. In order to make it possible to adapt the flow of ambient air supplied through the ram air channel to the varying demand, i.e. different requirements of the systems supplied with the ambient air, there is generally a movable element in the area of an air inlet arrangement and/or in the area of an air outlet arrangement of the ram air channel, or in the ram air channel itself. The movable element allows an increase, a decrease, or even a total closure of the flow cross-section of the air inlet arrangement, the air outlet arrangement or of the ram air channel. US 2009/0253361 A1 and WO 2006/067296 A1, for instance, disclose an arrangement comprising an air passage channel for an aircraft. The cross-section of the air passage channel is adjustable based on the speed and the altitude of the aircraft. To this end, the arrangement comprises a membrane elastically deformable under the action of a fluid control to enable the channel cross-section to be varied.

A steady air flow independent of the current state of a movable element used for regulating the ambient air supply is desirable.

SUMMARY

According to a first aspect of the disclosure herein, an apparatus comprising a ramp configured to enable variation of a cross section of an air passage is disclosed. The ramp comprises a first rigid member, a second rigid member and a flexible member coupled to the first rigid member and the second rigid member. The ramp is moveably mounted at two ends.

According to a second aspect of the disclosure herein, an arrangement comprising such an apparatus and a ram air channel communicating with the ram air passage of the apparatus is disclosed.

According to a third aspect of the disclosure herein, a method comprising varying a cross section of a ram air passage of such an apparatus by moving the ramp of the apparatus is disclosed.

For reasons of conciseness, in the following embodiments of the present disclosure are described mainly in the context of the apparatus according to the first aspect of the disclosure herein. However, according to the present disclosure, embodiments of an arrangement according to the second aspect of the disclosure herein and a method according to the third aspect of the disclosure herein may exhibit corresponding features as the described embodiments of an apparatus according to the first aspect. For these embodiments, what is described with respect to embodiments of an apparatus according to the first aspect of the disclosure herein applies analogously.

The ramp is configured to enable variation of the cross section of the air passage of the apparatus. It may thus be considered as a movable element used for ambient air supply regulation by varying the cross section of the ram air passage. The ramp comprises a first rigid member, a second rigid member and a flexible member coupled to the first rigid member and the second rigid member. As the ramp is movably mounted at two ends, the ramp ends are configured to enable a movement, e.g. a swivel movement. Thus, the ramp may move. When the ramp is moved, for instance by an actuator acting upon the ramp, so as to vary the air supply, e.g. supplied to a system of a vehicle comprising the apparatus, the cross section of the ram air passage may be varied according to the newly assumed shape and/or position of the ramp caused by the movement. When the ramp is moved, the flexible member will be affected by the movement. For instance, the shape of the flexible member will morph because of the ramp movement, e.g. the flexible member may bend. Due to the first member and the second member being coupled to the flexible member and due to the flexibility of the flexible member, the flexible member establishes a smooth junction between the first rigid member and the second rigid member. Independent of the movement performed by the ramp and its current position, the contour of the ramp may thus be smooth. It may be free of gaps and/or steps. Due to the rigidity of the first rigid member and the second rigid member, sufficient stability of the ramp may be ensured, in particular under operating conditions, namely at high ram air speeds. The rigid members may help keeping the ramp contour in its desired shape.

A smooth ramp contour may ensure that sharp deflections of the ram air flow are avoided. This may in turn reduce flow detachment in the ram air passage, thus enabling a smooth air flow and preventing unsteady flow conditions. As a consequence, pressure loss may be avoided. Furthermore, vibrations in the apparatus, which may be detrimental to its durability and also to that of a ram air channel connected thereto, may be reduced. Less maintenance work may be required. Likewise, aerodynamic benefits may arise. For instance, the drag of a vehicle, e.g. an aircraft, comprising the apparatus may be lowered.

The flexible member may replace a hinge that could have otherwise been used for connecting the first rigid member and the second rigid member. In comparison to the flexible member and in addition to the potentially adverse effects on flow conditions, a hinge may be expensive and failure-prone due to its mechanical complexity.

The ram air passage may have a first opening at a first end, the first opening being configured to communicate with the outside, thus enabling ram air to enter into the ram air passage or leave the ram air passage. The ram air passage may further have a second opening at a second end. The second opening may be configured to communicate with an opening of a ram air channel. Thus, ram air may enter into the ram air channel from the ram air passage or ram air may flow from the ram air channel into the ram air passage of the apparatus.

The first rigid member may for instance be a flap or a hatch. The base material of the first rigid member may for instance be a metallic material, e.g. aluminum or steel. Different shapes are possible for the first rigid member. As an example, the first rigid member may be shaped such that a surface of the first rigid member facing the ram air passage is a plain surface.

The explanations given above with respect to the first rigid member apply analogously for the second rigid member.

The flexible member being flexible may correspond to the flexible member being elastically deformable. In this case, it may be appropriate to refer to the flexible member as an elastically deformable member.

As a base material for the flexible member, plastics may for instance be used. The plastics material may be fiber-reinforced, e.g. carbon-fiber-reinforced. Other flexible materials, e.g. rubber, may be another option.

The flexible member, the first rigid member and the second rigid member may have a common base, e.g. they may be provided on a single body such as a board. As an example, a flexible material, e.g. carbon-fiber-reinforced plastics, may be chosen as a base material for the ramp. Lateral areas of the flexible material may be stiffened, e.g. by stiffeners made from a more rigid material, thus forming the first rigid member and the second rigid member on the base. In its central area, no stiffening of the flexible material may be performed so that a central part of the flexible material base forms the flexible member of the ramp.

The first rigid member and the second rigid member do not have to be entirely indeformable. Referring to them as rigid member is to express that they are more rigid than the flexible member.

The coupling of the flexible member to the first rigid member and the second rigid member may for instance comprise that the flexible member is mechanically coupled to the first rigid member and/or the second rigid member. Namely, a first end of the flexible member may be coupled to the first rigid member and a second end of the flexible member, e.g. opposing the first end, may be coupled to the second rigid member. The flexible member may serve as a connector mechanically connecting the first rigid member to the second rigid member. According to an embodiment, apart from fasteners connecting the flexible member to the first rigid member and/or fasteners connecting the flexible member to the second rigid member, no other intervening elements are provided between the flexible member and the first rigid member as well as between the flexible member and the second rigid member.

The flexible member may extend on to a surface of the first flexible member and/or the second flexible member. The flexible member may even extend beyond an outer edge of the first rigid member and/or the second rigid member, i.e. an edge of the respective rigid member opposed to an edge facing the respective other rigid member.

The ramp may constitute a boundary of the ram air passage. The ram air passage may additionally be defined by a wall. Due to its two ends being movably mounted, the ramp may be considered as being movable. Namely, it may be movable with respect to a wall providing a ram air passage boundary. Thus, a height and/or width of the ram air passage may be varied, thereby varying a cross section of the ram air passage. The variation of the cross section of the ram air passage may in particular mean that the area of the cross section of the ram air passage through which ram air may pass, i.e. the flow cross section of the ram air passage, may be varied.

The movable mounting of two ends of the ramp may have the effect that each respective end may be moved in at least one direction, e.g. in a direction having a component perpendicular to a ram air flow direction in the ram air passage.

The two movably mounted ends of the ramp may be opposing ends of the ramp. For instance, the ramp may be movably mounted at a first end being displaced from a center of the ramp, e.g. a center of the flexible member, towards the first rigid member. In addition, the ramp may be movably mounted at a second end being displaced from a center of the ramp towards the second rigid member.

The two ends of the ramp may be displaced with respect to each other in a direction parallel to a main ram air flow direction in the ram air passage.

The ramp being movably mounted at two ends has to be understood as that the ramp is movably mounted at at least two ends. The ramp may thus be movably mounted at more than two ends thereof.

For movably mounting an end of the ramp, suitable mounting structure may be provided. The mounting structure may for instance comprise a ball joint or a hinge to name but two examples.

According to an embodiment, the ramp is configured to be able to assume at least a first position and a second position different from the first position, wherein the flexible member is configured to exhibit different curvatures in the first position and the second position of the ramp.

When the flexible member exhibits different curvatures in the first and second positions of the ramp, the different curvatures of the flexible member may assure that even though the ends of the ramp move so as to allow the change of the ramp position to occur, the contour of the ramp may stay smooth. At the same time, the coupling of the first rigid member and the second rigid member to the flexible member may be maintained.

The different curvatures of the flexible member may be caused by the flexible member bending when the ramp transitions from the first to the second position.

In the first position of the ramp, the cross section of the ram air passage may be different to the cross section of the ram air passage when the ramp is in the second position.

The curvature of the flexible member being different may for instance comprise that the radius of curvature is different in the first position and in the second position of the ramp.

The ramp may be configured to be able to assume more than two different positions and each position of the ramp may be associated with a different curvature of the flexible member and/or with a different cross section of the ram air passage. Specifically, the ramp may be configured to be continuously movable. It may thus be configured to be able to assume an infinite number of different positions. An infinite number of different curvatures and/or ram air passage cross sections may be possible in this case. To enable the ramp to move continuously, the mounting of the ramp at its two ends may be chosen accordingly, e.g. hinges configured for continues movement may be employed.

According to an embodiment, the apparatus forms part of an intake of a ram air channel.

The apparatus may thus enable regulation of the amount of ram air entering the ram air channel and shape the ram air flow. Providing an embodiment of the apparatus at an intake of a ram air channel may prove particularly helpful.

The ram air may enter the intake and thus the apparatus without any prior manipulation of the ram air flow. It may therefore be highly desirable to provide structure or an approach for ensuring that the amount of air entering the ram air channel via the intake and its flow characteristics are regulated according to the needs for the specific application and the current demands. All systems supplied with the ram air and all components arranged further downstream in the flow path of the ram air may benefit therefrom.

The apparatus forming part of an intake of a ram air channel may comprise that the apparatus is provided at, e.g. attached to, a ram air channel. In particular, the apparatus may be provided upstream the ram air channel. The ram air passage of the apparatus may have an opening at an upstream end and an opposing downstream end communicating with the ram air channel, e.g. communicating with an opening of the ram air channel. Ram air may enter the ram air passage of the apparatus at its upstream end opening, pass through the ram air passage, leave it via its downstream end opening and the enter the ram air channel via the opening that communicates with downstream end opening of the ram air passage of the apparatus.

According to an embodiment, the apparatus forms part of an outlet of a ram air channel.

The apparatus may thus enable regulation of the amount of ram air leaving the ram air channel and shaping of its flow characteristics. Regulation of the amount of ram air leaving the ram air channel may be important. Such a regulation may for instance be required to ensure proper pressure conditions in the ram air channel and/or a system provided with ram air via the ram air channel. Regulation of the flow characteristics may for instance be necessary in order to maintain proper aerodynamic characteristics of a vehicle, e.g. an aircraft, comprising the ram air channel and the ram air outlet.

The apparatus forming part of an outlet of a ram air channel may comprise that the apparatus is provided at, e.g. attached to, a ram air channel. In particular, the apparatus may be provided downstream the ram air channel. The ram air passage of the apparatus may have an opening at a downstream end and at an opposing upstream end. The upstream end opening may communicate with the ram air channel, e.g. communicate with a downstream opening of the ram air channel. Ram air may leave the ram air channel via its downstream opening, enter the ram air passage of the apparatus via its upstream opening that communicates with the ram air channel and leave the ram air passage via its downstream end opening.

The apparatus forming part of an intake or an outlet of a ram air channel may also comprise that the apparatus is provided in a ram air channel. In this case, the ram air channel surrounds the apparatus and the ram air passage of the apparatus is located in the ram air channel. According to an embodiment, the apparatus forming part of a ram air channel may correspond to the ramp being arranged in the ram air channel and two ends thereof being movably mounted in the ram air channel. If the apparatus forms part of an intake of a ram air channel, it may be arranged at or near to an upstream end of the ram air channel. Correspondingly, if the apparatus forms part of an outlet of a ram air channel, it may be arranged at or near to a downstream end of the ram air channel.

According to an embodiment, the ram air channel is an aircraft ram air channel.

Aircrafts are generally capable of moving at comparatively high velocities, in particular when cruising. Accordingly, ram air speed may also be comparatively high. This may on the one hand put a significant mechanical load on the ramp of the apparatus. Due to its potentially robust construction, e.g. due to the fact that no hinge needs to be provided to connect the first rigid member and the second rigid member, the apparatus may be well suited for operation in this environment. On the other hand, high ram air velocities may have particularly severe effects if flow conditions are unsteady. Hence, employing the apparatus may prove exceedingly useful.

According to an embodiment, at least one of the first rigid member and the second rigid member is movably mounted.

A respective movably mounted rigid member may thus form a movably mounted end of the ramp.

According to an embodiment, at least one movably mounted end of the ramp is an end of the flexible member.

For instance, the flexible member may extend beyond an outer edge of the first rigid member and/or the second rigid member, e.g. it may extend beyond an edge of the respective rigid member opposed to an edge facing the respective other rigid member. An end of the flexible member extending beyond the outer edge of the respective rigid member may be movably mounted.

According to an embodiment, at least one end of the ramp is swivel-mounted.

A swivel-mounted end may on the one hand be easily moved to induce a movement of the ramp or to follow a movement induced by another part of the ramp. On the other hand, a swivel-mounted end may provide comparatively high stability in a direction perpendicular to the respective swivel direction. This may be useful for ensuring high durability of the apparatus and/or keeping the respective swivel-mounted end in its proper position during operation even at high ram air flow velocities.

In the context of the presently discussed embodiment, only one end of the ramp may be swivel-mounted. Likewise, both ends may be swivel-mounted. As an example, a swivel-mounted end of the ramp may for instance be hinge-mounted.

According to an embodiment, the apparatus further comprises an actuator configured to act upon the ramp.

By providing such an actuator, the ramp may be actively moved and the cross section of the ram air passage may thus be actively varied to meet the current ram air requirements. The ramp does not have to be constructed in a way that allows for passive movement of the ramp, e.g. by ram air being guided towards the ramp and acting upon the ramp so as to move the ramp. Consequently, the ramp movement and the ramp position may be controlled independently of current ram air flow characteristics, in particular independently of ram air speed.

The actuator may for instance act upon the first rigid member, the second rigid member and/or the flexible member. The actuator may for instance be an electrically driven actuator or a hydraulically operated actuator to name but two examples.

According to an embodiment, the actuator is external to the ramp.

The actuator being external to the ramp may be understood as the actuator being arranged so that the when the ramp is moved by being acted upon by the actuator, the actuator itself is not moved with the ramp. With the actuator being external to the ramp, the mass that has to be moved when the ramp is moved may be kept low.

According to an embodiment, the external actuator is mounted outside the ram air passage. In this case, the actuator may thus not interfere with a ram air flow through the ram air passage. The external actuator may for instance be mounted on a wall, e.g. a wall of the apparatus, that is opposed to the ramp on the far side of the ram air passage.

According to an embodiment, the actuator is mechanically coupled to the flexible member.

If the actuator is mechanically coupled to the flexible member, the actuator may act directly upon the flexible member when being actuated and the area of the flexible member on which the actuator acts may be chosen as desired. Thereby, it may for instance be determined where the flexible member is bent. Thus, the form of the flexible member when being acted upon by the actuator may be controlled.

According to an embodiment, the actuator is mechanically coupled to at least one of the first rigid member and the second rigid member, i.e. coupled to the first rigid member and/or the second rigid member.

Coupling the actuator to the first rigid member and/or the second rigid member may be easier to perform due to the rigidity of the rigid members. In addition to being coupled to at least one of the first rigid member and the second rigid member, the actuator may additionally be coupled to the flexible member.

A connector may be provided for mechanically coupling the actuator to the flexible member or to at least one of the first rigid member and the second rigid member.

According to an embodiment, the actuator is integrated into the ramp.

When the actuator is integrated into the ramp, the ram air passage may be kept unobstructed by the actuator. At the same time, installation space requirements may be comparatively low.

The integration of the actuator into the ramp may for instance comprise that the actuator is attached to the flexible member. Alternatively or in addition, the actuator may also be attached to the first rigid member and/or the second rigid member. Moreover, the actuator may extend primarily parallel to the ramp. It may further be essentially flat. Due to the integration of the actuator into the ramp, when the ramp moves, the actuator may automatically move as well.

According to an embodiment, the actuator comprises a deformable element.

The deformable element may for instance be an electrically deformable element or a hydraulically deformable element. The deformable element may for instance contract or expand when a voltage is supplied thereto or when a fluid is injected into the deformable element or extracted therefrom. If the deformable element is attached to the flexible member, it may force the flexible member to change its shape according to the contraction or expansion of the deformable element. Likewise, if the deformable element is attached to the first rigid member and the second rigid member, a contraction of the deformable element may force the first rigid member and the second rigid member to move towards each other, thus forcing the flexible member coupled to them to change its shape. Accordingly, an extraction of the deformable member may cause the first rigid member and the second rigid member to move apart, thereby also forcing the flexible member to change its shape.

Other features of the present disclosure will become apparent from the following detailed description considered in conjunction with the accompanying drawings. However, the drawings are designed solely for purposes of illustration and not as a definition of the limits of the disclosure herein, for which reference should be made to the appended claims. The drawings are not drawn to scale and that they are merely intended to conceptually illustrate the structures and procedures described herein.

DETAILED DESCRIPTION

Figure 1:
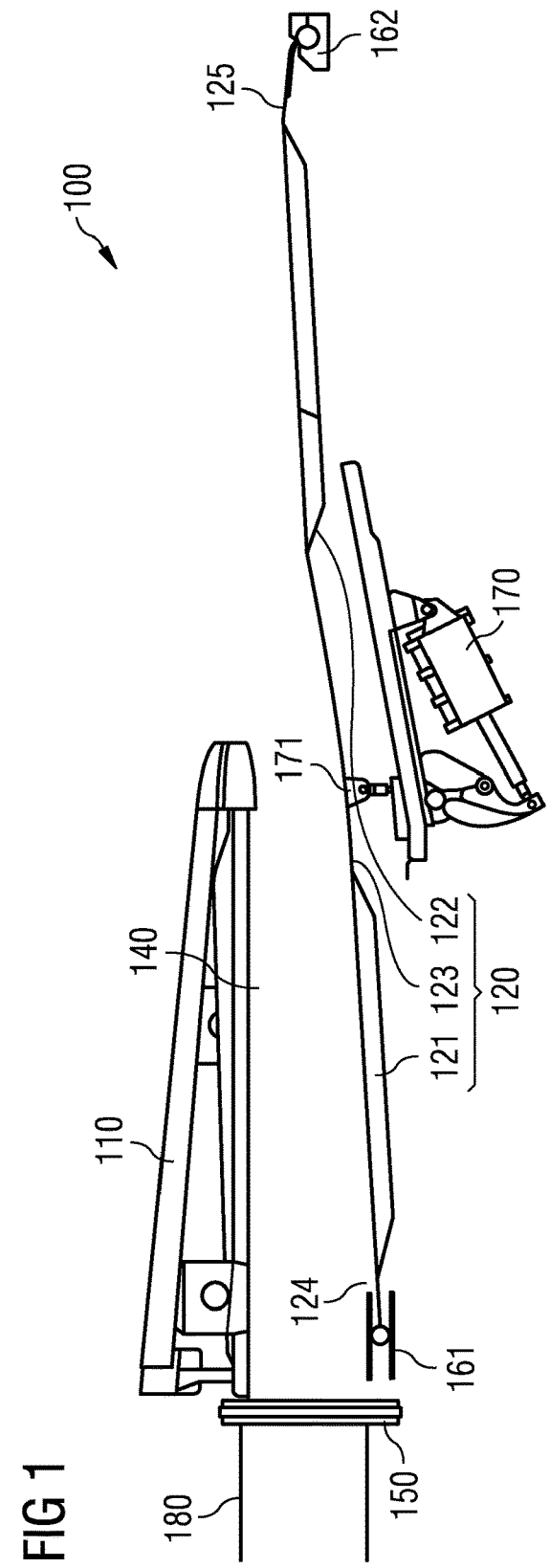
FIG. 1: is a schematic illustration of a longitudinal section of an embodiment of an apparatus according to the present disclosure in a first state.

FIG. 1 shows a schematic illustration of a longitudinal section of an embodiment of an apparatus 100 according to the present disclosure in a first state.

Apparatus 100 is an intake of an aircraft ram air channel 180 (only partially shown in FIG. 1). Apparatus 100 comprises an upper wall part 110 and a ramp 120 forming a lower boundary of a ram air passage 140. A fitting 150 is provided at a downstream end of ram air passage 150. Ram air entering ram air passage 140 via an upstream end opening of ram air passage 140 may pass through ram air passage 140 towards an upstream opening of fitting 150. The upstream opening of fitting 150 communicates with ram air passage 140. The downstream end of fitting 150 is connected to ram air channel 180 so that ram air that has entered ram air passage 140 may flow into ram air channel 180 and may then be used for supplying one or several systems of the aircraft with ram air, e.g. for cooling bleed air used for pressurizing the aircraft cabin.

Ramp 120 of intake apparatus 100 comprises an elastically deformable flexible member 123 as a base of the ramp. Flexible member 123 is made of carbon-fiber-reinforced plastics. Lateral areas of flexible member 123 are stiffened by stiffeners made from a more rigid material. Thus, a first rigid member 121 and a second rigid member 122 of ramp 120 are formed. First rigid member 121 and the second rigid member 122 are not entirely indeformable. However, they are more rigid than flexible member 123.

Figure 2:
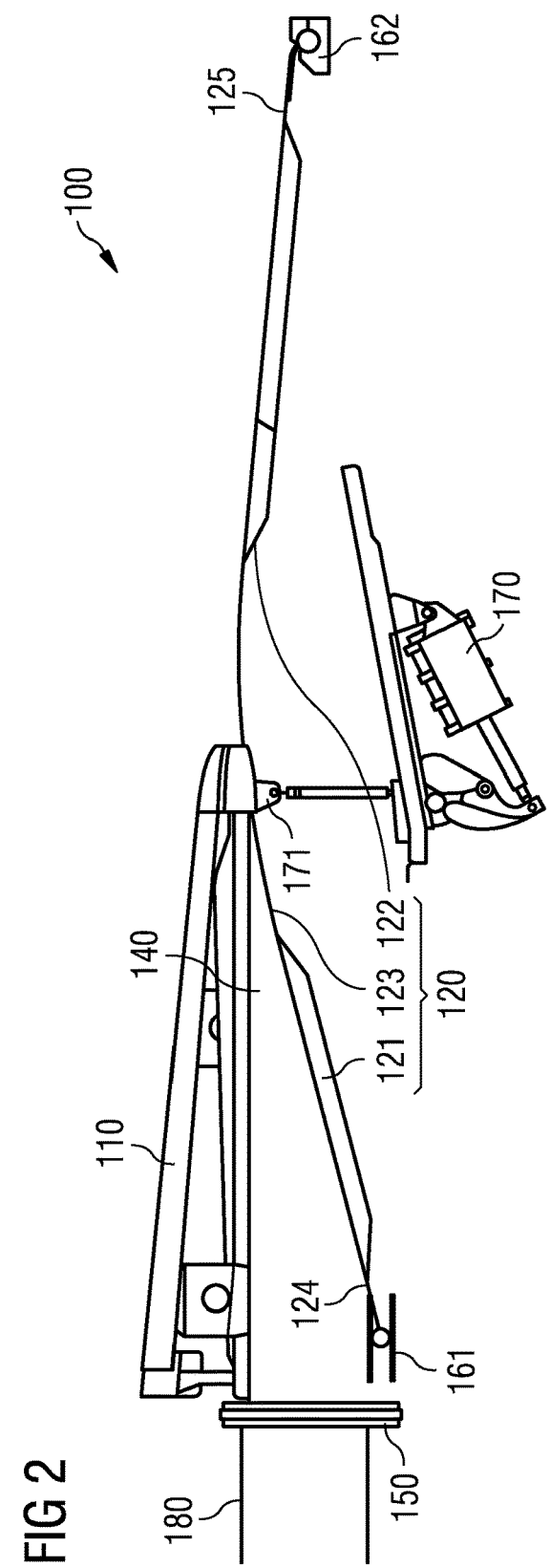
FIG. 2: is a schematic illustration of a longitudinal section of the apparatus of FIG. 1 in a second state.

As both first rigid member 121 and second rigid member 122 are provided on flexible member 123, flexible member 123 is mechanically coupled to first rigid member 121 and second rigid member 122. In FIG. 2, flexible member 123 extends beyond an outer left edge of first rigid member 121, i.e. an edge of first rigid member 121 opposed to an edge facing second rigid member 122. Likewise, flexible member 123 extends beyond an outer right edge of second rigid member 122, i.e. an edge of second rigid member 122 opposed to an edge facing first rigid member 121. The opposing ends 124 and 125 of flexible member 123 extending beyond the outer edges of the rigid members 121, 122 are hinge-mounted by hinges 161 and 162, respectively. Hinges 161, 162 allow continuous movement of ramp ends 124, 125 in their respective swivel directions and provide high stability in a direction perpendicular thereto, namely in a direction into the image plane of FIG. 2.

An actuator 170 external to ramp 120 is provided. Actuator 170 is configured to act upon ramp 100. It is connected to ramp 120, namely to flexible member 123, by a connector 171. Actuator 170 may for instance be an electrical actuator or a hydraulic actuator. Actuator 170 is mounted outside ram air passage 140 so as not to interfere with a ram air flow through ram air passage 140.

In FIG. 1, the apparatus 100 is in a first state. The first state is characterized by a first position and a first shape of ramp 120. In FIG. 1, flexible member 123 has a first radius of curvature. Also, apparatus 100 has a first intake height. The first intake height corresponds to a first area of a cross section of ram air passage 140 through which ram air may pass, i.e. to a first flow cross section.

By actuating actuator 170, a force may be exerted upon flexible member 123. Thus, a movement of ramp 170 may be induced and the intake height may be varied. Thus, the flow cross section of ram air passage 140 may be varied. Thereby, regulation of the amount of ram air provided to ram air channel 180 becomes possible.

FIG. 2 shows a schematic illustration of a longitudinal section of the apparatus 100 of FIG. 1 in a second state. The second state is characterized by another position and shape of ramp 120. The transition of ramp 120 regarding position and shape has been induced by actuator 170. As can be seen in FIG. 2, the movement induced by the force exerted upon flexible member 123 included a movement of first rigid member 121, second rigid member 122 and flexible member 123. In FIG. 2, ramp 120 is in a position in which it entirely closes an upstream end of ram air passage 140. The flow cross section of ram air passage 140 is thus 0. Moreover, the shape of flexible member 123 has changed. Specifically, flexible member 123 now exhibits a second radius of curvature different from the first radius of curvature illustrated in FIG. 1. The contour of ramp 120 has morphed.

However, independent of the movement of ramp 120, the contour of ramp 120 remained smooth due to the flexibility of flexible member 123. Both in the state illustrated in FIG. 1 and in the state illustrated in FIG. 2, flexible member 123 establishes a smooth junction between first rigid member 121 and second rigid member 122. The surface of ramp 120 facing ram air passage 140 remains free of gaps and steps. Because of the rigidity of first rigid member 121 and second rigid member 122, sufficient stability of ramp 120 is provided—also under operating conditions, namely at high ram air velocities, e.g. under aircraft cruise conditions. Rigid members 121, 122 help keeping the ramp contour in its desired shape.

The smooth ramp contour ensures that sharp deflections of the flow are avoided. This reduces flow detachment in ram air passage 140, thus enabling a smooth air flow and preventing unsteady flow conditions. As a consequence, pressure loss may be avoided. Furthermore, vibrations in intake apparatus 100, which may be detrimental to its durability and also to that of ram air channel 180, may be reduced. Less maintenance work may be required. Likewise, aerodynamic benefits may arise. For instance, the drag of the aircraft comprising intake apparatus 100 may be lowered.

Moreover, flexible member 123 may replace a hinge that could have otherwise been used for connecting first rigid member 121 and second rigid member 122. In addition to adverse effects on flow conditions, in comparison to flexible member 123 a hinge may be expensive and failure-prone due to its mechanical complexity Aircrafts are generally capable of moving at comparatively high velocities, in particular when cruising. Accordingly, ram air speed may also be comparatively high. This may on the one hand put a significant mechanical load on ramp 120. As no hinge is provided for connecting first rigid member 121 and second rigid member 122, ramp 120 may be particularly robust. On the other hand, high ram air speeds may have particularly severe effects if flow conditions are unsteady. Employing intake apparatus 100 may therefore prove exceedingly useful.

All presented embodiments are only examples. Any feature presented for a certain embodiment may be used with any aspect of the disclosure herein on its own or in combination with any feature presented for the same or another example embodiment and/or in combination with any other feature not mentioned. Any feature presented for an example embodiment in a certain category may also be used in a corresponding manner in an example embodiment of any other category.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An apparatus comprising:
a ramp configured to enable variation of a cross section of a ram air passage of the apparatus, wherein the ramp comprises:
a first rigid member;
a second rigid member; and
a flexible member coupled to the first rigid member and the second rigid member,
wherein the ramp is movably mounted at two ends; and
an actuator external to the ramp which is configured to act upon the ramp for moving the ramp,
wherein the actuator is mechanically coupled only to a center region of the flexible member so that a radius of curvature of the flexible member substantially decreases as the cross section of the ram air passage decreases, and
wherein the ramp is configured to entirely close the ram air passage.

2. The apparatus according to claim 1, wherein the ramp is configured to be continuously movable, and wherein the flexible member is configured to exhibit continuous curvatures.

3. The apparatus according to claim 1, wherein the apparatus forms part of an intake of a ram air channel.

4. The apparatus according to claim 1, wherein the apparatus forms part of an outlet of a ram air channel.

5. The apparatus according to claim 1, wherein the ram air passage is an aircraft ram air channel.

6. The apparatus according to claim 1, wherein at least one movably mounted end of the ramp is an end of the flexible member.

7. The apparatus according to claim 1, wherein at least one of the first rigid member and the second rigid member is movably mounted.

8. The apparatus according to claim 1, wherein at least one end of the ramp is swivel-mounted.

9. An arrangement comprising:
an apparatus comprising:
a ramp configured to enable variation of a cross section of a ram air passage of the apparatus, wherein the ramp comprises:

a first rigid member;

a second rigid member; and a flexible member coupled to the first rigid member and the second rigid member, wherein the ramp is movably mounted at two ends; and an actuator external to the ramp which is configured to act upon the ramp for moving the ramp, wherein the actuator is mechanically coupled only to a center region of the flexible member so that a radius of curvature of the flexible member substantially decreases as the cross section of the ram air passage decreases, and wherein the ramp is configured to entirely close the ram air passage; and a ram air channel communicating with the ram air passage.

10. A method for varying a cross section of a ram air passage of an apparatus, comprising:

providing an apparatus comprising:

a ramp, the ramp being configured to enable variation of a cross section of a ram air passage of the apparatus, the ramp comprising:

a first rigid member, a second rigid member, and a flexible member coupled to the first rigid member and the second rigid member, wherein the ramp is movably mounted at two ends, and an actuator external to the ramp which is configured to act upon the ramp, wherein the actuator is mechanically coupled only to a center region of the flexible member so that a radius of curvature of the flexible member substantially decreases as the cross section of the ram air passage decreases, and wherein the ramp is configured to entirely close the ram air passage; and moving the ramp of the apparatus to vary the cross section of the ram air passage of the apparatus by actuating the actuator.

* * * * *